United States Patent [19]

Rigdon

[11] 4,382,731
[45] May 10, 1983

[54] ROTARY MACHINING APPARATUS

[76] Inventor: Russell L. Rigdon, 3272 Pine Valley Dr., Sarasota, Fla. 33579

[21] Appl. No.: 302,838

[22] Filed: Sep. 16, 1981

Related U.S. Application Data

[63] Continuation-in-part of Ser. No. 88,770, Aug. 29, 1981, abandoned.

[51] Int. Cl.³ .................... B23D 37/14; B23D 43/06
[52] U.S. Cl. ........................ 409/248; 407/12; 409/262; 409/265; 409/283
[58] Field of Search .............. 409/256, 257, 262, 263, 409/264, 265, 268, 269, 273, 282, 283, 158, 163, 248; 407/42, 12

[56] References Cited

U.S. PATENT DOCUMENTS

| Re. 16,903 | 3/1928 | Rose ................................ 409/158 |
| 1,177,569 | 3/1916 | Hanson ............................ 409/163 |
| 2,113,554 | 4/1938 | Johnson ........................... 409/262 |
| 2,123,777 | 7/1938 | Hart ................................. 409/262 X |
| 2,317,262 | 4/1943 | Dusevoir .......................... 407/42 X |

*Primary Examiner*—Z. R. Bilinsky
*Attorney, Agent, or Firm*—Gifford, VanOphem, Sheridan & Sprinkle

[57] ABSTRACT

An apparatus is provided for machining a flat surface on a workpiece and comprises an annular frame on which an annular wheel is rotatably mounted around a predetermined axis of rotation. A plurality of circumferentially spaced cutting members are secured to one axial surface of the wheel and preferably these cutting members are broaching tools. At least one, and preferably a plurality of circumferentially spaced workpiece holding fixtures are also mounted to the frame so that each fixture is open to, spaced from and axially aligned with said axial surface of said wheel. Each fixture can hold one workpiece with the surface to be machined adjacent the axial surface of the wheel with the cutting members. The wheel is continuously rotatably driven by a suitable motor at a high rotational speed, i.e. in excess of 200 surface feet/minute, while a feed unit associated with each fixture selectively axially moves its fixture with its workpiece towards the wheel, i.e. in the direction of the stock to be removed whereupon the cutting members engage and machine the desired workpiece surface. Thus, multiple workpieces can be simultaneously machined at high speeds limited only by the strength of the wheel and the power of the motor. In one form of the invention, the workpiece is incrementally fed toward the wheel during each wheel revolution thus incrementally removing stock from the workpiece.

8 Claims, 3 Drawing Figures

ROTARY MACHINING APPARATUS

CROSS REFERENCE TO RELATED APPLICATIONS

This is a continuation of application Ser. No. 88,770, filed Aug. 29, 1981, now abandoned.

BACKGROUND OF THE INVENTION

1. Field of the Invention

The present invention relates generally to machining devices and, more particularly, to a rotary machining device for machining a flat surface on a workpiece.

2. Description of the Prior Art

There are many different types of manufacturing applications in which it is desirable to machine a flat surface on a workpiece. For example, one such application would be to machine a flat surface for the cylinder head on a cylinder block for an internal combustion engine. In such applications, it is desirable and oftentimes necessary that the machine surface be as flat as possible so that the engine block and the cylinder head mate together.

When machining such workpiece surfaces, it has been the previous practice to utilize a linear ram. In a linear ram, the ram is mounted on an elongated track and includes a plurality of broaching tools mounted to its lower surface. With the ram positioned at one end of the track, the workpiece is secured to the track so that its surface to be machined faces upwardly and in alignment with the lower surface of the ram. Thereafter, the ram is propelled along the track to the opposite end by hydraulic or other suitable means and, in doing so, machines the desired surface of the workpiece. The ram is then retracted to the first end of the track and the process is repeated.

The previously known linear rams, however, are disadvantageous for a number of different reasons. One disadvantage of the linear ram is that the ram must be propelled along the track, stopped at the opposite end of the track and retracted for each machining operation. Thus, due to the cyclic operation of the ram, the power requirements for the linear ram are excessive when compared to the actual machining performed.

A still further disadvantage of many linear rams is that the machine cycle time is necessarily long, typically in excess of 25 seconds, due to the required stopping and retraction of the linear ram for each machining cycle. Moreover, since the ram must attain a predetermined speed from a dead stop before the machining of the workpiece commences, the ram with its associated track is bulky in construction and occupies a great deal of space.

A still further disadvantage of these previously known rams is their massive size requirements and the limitation of the cutting speed due to their size limitations and required cycling. The relatively low cutting speed and single pass operation of these rams causes excessive cutting tool pressure on the workpiece which can damage fragile and/or thin workpieces. Lastly, these linear rams are capable of machining only a single workpiece per machining cycle.

There have, however, been a number of previously known rotary broaches or cutting machines, such as that disclosed in U.S. Pat. No. 2,113,554 to J. R. Johnson. This rotary broach, however, was disadvantageous for a number of reasons. First, the wheel containing the cutting tools was cyclically rotated and stopped for each machine cycle. Because of this, only low speed machining of the workpiece was obtainable. Moreover, only a single workpiece could be machined at a given time and at a given work station.

SUMMARY OF THE PRESENT INVENTION

The present invention overcomes all of the above mentioned disadvantages of the previously known linear rams and rotary broaches by providing a rotary machining device capable of continuous high speed operation, which is relatively compact in construction and which is capable of simultaneously machining multiple workpieces.

In brief, the rotary machining device according to the present invention comprises a frame which is generally annular in cross section and has an annular track adjacent its upper end. An annular wheel is rotatably mounted to the frame along the track so that the wheel can rotate about a predetermined axis of rotation. Suitable motor means mounted to the frame rotatably drive the wheel at a continuous and high rate of rotation, for example one revolution per second for an eight foot diameter wheel.

A plurality of cutting members, such as broaches, are secured to the lower axial end of the wheel and these cutting members protrude axially downwardly from the wheel in a progressively increasing amount in the direction opposite from the direction of rotation of the wheel. In addition, the cutting members preferably extend around only a portion of the circumfery of the wheel thus forming an open space on the wheel between the beginning and the tail end of the cutting members.

At least one and preferably a plurality of workpiece holding fixtures are each mounted to a feed unit. These feed units in turn are circumferentially spaced and mounted to the frame so that each fixture is at a position open to, spaced from and axially aligned with the lower axial surface of the wheel. Each fixture includes means for holding its workpiece with the workpiece surface to be machined adjacent the lower axial surface of the wheel.

Each feed unit is operable, upon activation, to axially shift its fixture with its contained workpiece toward the lower wheel surface whereupon the cutting members engage and machine the workpiece surface. Moreover, in the preferred form of the invention, each feed unit is activated when the workpiece is aligned with the open area on the wheel surface so that the workpiece is properly and entirely positioned before any machining on its surface begins.

In one form of the invention the feed unit incrementally feeds the workpiece towards the wheel once per wheel revolution when the workpiece is aligned with the open space on the wheel so that the total machining of the workpiece is carried out in a predetermined number of cutting cycles or revolutions of the wheel. Due to the high rotational speed of the wheel, however, the overall machining cycle is only slightly increased. For the example used, a five pass machining cycle would require only five seconds as opposed to one second for a single pass machining cycle.

Since the wheel is continuously rotatably driven, when only one fixture is used, the machine cycle time is primarily dependent upon the load and unload time of the workpieces. Conversely, with the use of circumferentially spaced multiple holding fixtures, it is possible to machine one or more workpieces while simultaneously loading and/or unloading other workpieces thus obtaining continuous machining. In this case, the machine cycle time is dependent upon the rotational speed of the wheel, the number of cutting passes and the number of work stations.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF THE PRESENT INVENTION

Figure 1:
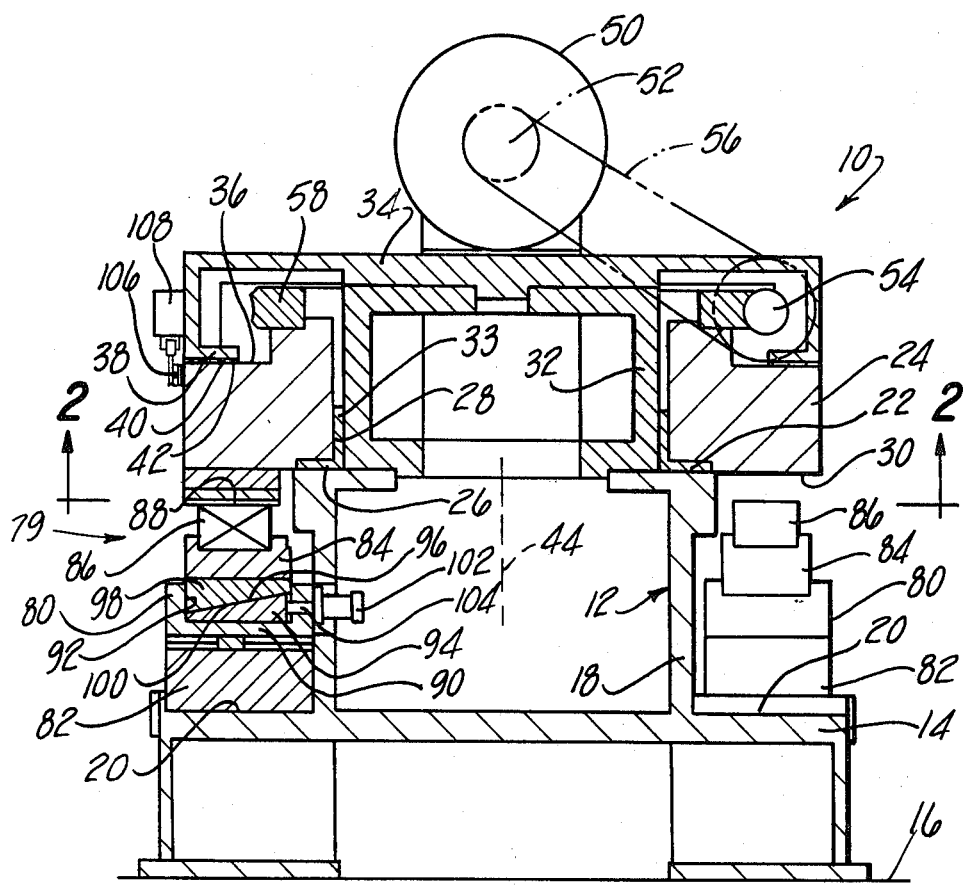
FIG. 1 is a longitudinal sectional view illustrating the apparatus according to the present invention.

With reference first to FIG. 1, the apparatus according to the present invention is thereshown and comprises a frame 12 having a generally circular longitudinal cross-sectional shape. The frame 12 further includes an enlarged diameter lower base portion 14 which is supported by a suitable ground support surface 16. A reduced diameter stem portion 18 of the frame 12 extends upwardly from the base 14 thus defining an annular and generally horizontal surface 20 on the upper end of the base 14. The upper end of the frame stem portion 18 further forms a horizontal and generally annular track 22.

An annular wheel 24 is positioned coaxially on top of the frame stem portion 18 so that an annular surface 26 on the lower and inner end of the wheel 24 registers with the annular track 22 on the frame stem portion 18. In addition, suitable bearing means 28 are positioned in between the wheel 24 and the frame stem 18 so that the wheel 24 is coaxially rotatably mounted to the frame 12. The wheel 24 further includes an annular lower surface 30 which extends radially and horizontally outwardly from the frame stem 18 and above the frame support surface 20.

A circular frame part 32 is in turn secured to the upper end of the frame stem 18 by means not shown and a suitable bearing means 33 is positioned in between the frame part 32 and the wheel 24 to prevent radial movement of the wheel 24. A crown 34 in turn is secured to the upper end of the frame part 32 and extends over the upper end 36 of the wheel 24. The crown 34 includes a downwardly depending portion 38 having a lower surface 40 which is parallel to but spaced from the upper axial end 36 of the wheel 24. Conventional bearing means 42 are positioned in between the lower end 40 of the crown downwardly depending portion 38 and the upper end 36 of the wheel 24.

The bearing means 26, 33 and 42 all permit the wheel 24 to rotate about a predetermined vertical axis 44 with respect to the frame 12. The bearing means 33, however, prevents radial movement of the wheel while the axial ends of the wheel 24 are sandwiched in between the bearing means 26 and 42 which prevents axial displacement of the wheel.

A motor means 50 having an output shaft 52 is mounted to the frame 12 or, as shown in FIG. 1, is mounted to the top of the crown 34. The motor means 50, can be of any conventional construction, such as an electric or hydraulic motor, and drives a worm gear 54 rotatably mounted to the crown via a drive belt or chain 56. The worm gear 54 in turn cooperates with an annular worm gear 58 secured to the upper end of the wheel 24. Thus, upon activation of the motor means 50, the wheel 24 is rotatably driven in a direction 60 about the axis 44.

As will be subsequently more fully described, the motor means 50 continuously rotatably drives the wheel 24 at a high rotational speed, typically 200-2000 surface feet/minute. Thus, assuming the wheel 24 has an eight foot diameter, the wheel 24 is rotatably driven at speeds up to one revolution per second.

Figure 2:
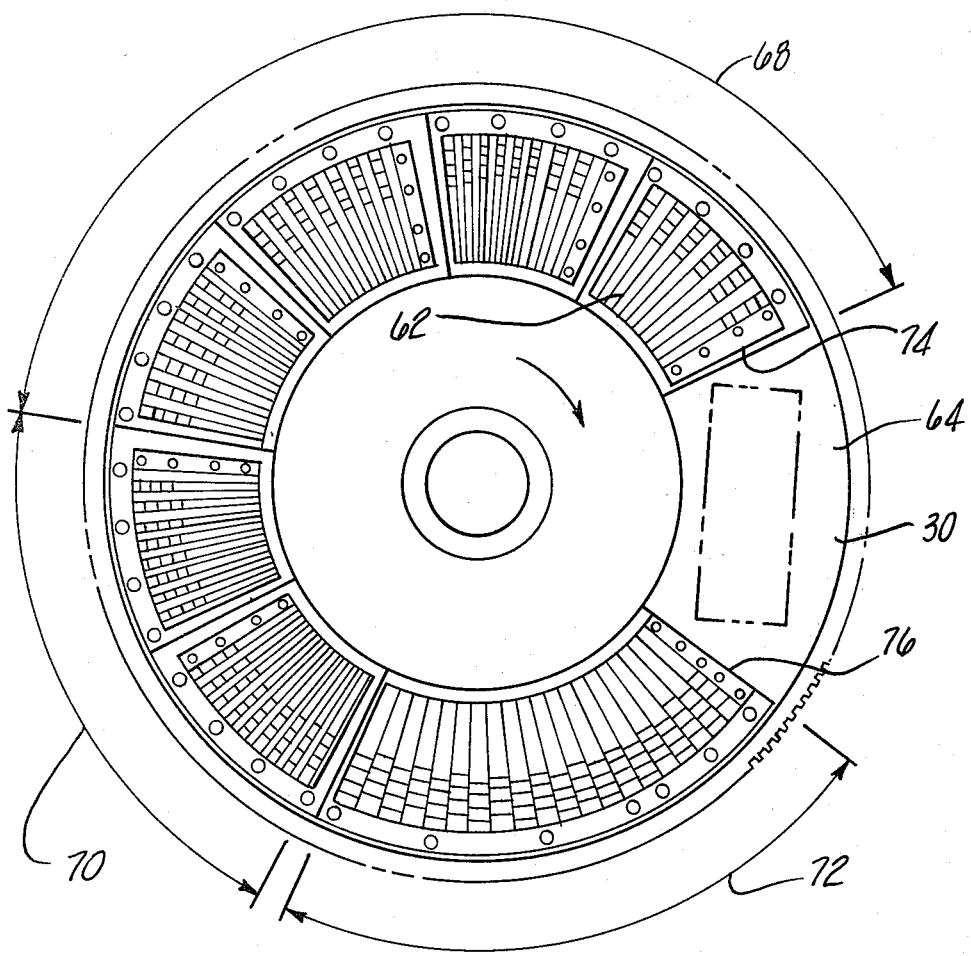
FIG. 2 is a sectional view taken substantially along line 2—2 in FIG. 1.

Referring now to FIGS. 1 and 2, a plurality of circumferentially spaced cutting members 62 are secured to and around the lower surface 30 of the wheel 24. Preferably the cutting members 62 extend only part way around the circumfery of the wheel 24 thus forming an open space 64 on the wheel surface 30. The circumferential length of the open space is somewhat longer than the length of the workpiece for a reason to be subsequently described.

The cutting members 62 are preferably divided into three different sections 68, 70 and 72 extending in a direction opposite from the direction of rotation from the open space 64. Rough cutting members are disposed in section 68 while semifinish and finish cutting members are positioned in sections 70 and 72, respectively.

Although the cutting members 62 may take any of several forms, they are constructed of a super hard material, such as cemented carbides or diamond tools. Such cutting members 62 are capable of machining at high rotational speeds of the wheel 24, for example up to 2000 surface feet per minute. Moreover, the cutting members 62 protrude axially downwardly from the lower surface 30 of the wheel 24 in a progressively increasing amount from the start 74 and to the tail 76 of the cutting members 62, i.e. in the direction opposite from the direction of rotation of the wheel 24.

At least one and preferably a plurality of work stations 79 (two work stations are illustrated in FIG. 1) are circumferentially spaced around the frame 12. The total number of work stations is limited only by the diameter of the wheel 24 and the size of the workpiece machined. Since the work stations 79 are substantially identical to each other, only a single station 79 will be described in detail, it being understood that a like description also applies to the other stations 79.

Referring again to FIG. 1, the work station 79 comprises a feed unit 80 mounted upon a spacer 82 which in turn is mounted on the base supporting surface 20. A workpiece holding fixture 84 in turn is mounted on top of the feed unit 80 and includes means for holding a workpiece 86 having a surface 88 which is to be machined. The feed unit 80 is operable, as will be shortly described, to move the workpiece 86 between a lower position in which the workpiece surface 88 is spaced from the cutting members 62 and an upper position in which the cutting members 62 engage and machine the workpiece surface 88.

Still referring to FIG. 1, the feed unit 80 further comprises a base 90 having a U-shaped channel 92 in which a first wedge member 94 is positioned. The wedge member 94 has an upper inclined surface 96 and a width less than the width of the channel 92 so that the wedge member 94 can be radially displaced within the channel 92. Similarly, a second wedge member 98 has an inclined surface 100 and is positioned within the channel 92 so that the inclined surfaces 100 and 96 flatly abut against each other. The second wedge member 98, however, has a width equal to the width of the channel 92 and thus can move only in a direction parallel to the axis 44 of the wheel 24. The workpiece fixture 84 in turn is positioned upon the top of the second wedge member 98 and secured to it by conventional means.

A feed cylinder 102 is operatively coupled to the first wedge member 94 by a piston 104 so that upon retraction of the piston member 104, the workpiece fixture 84 with its attached workpiece 86 is shifted downwardly and away from the cutting members 62 on the wheel 24. Conversely, upon extension of the piston 104, the fixture 84 with its attached workpiece 86 is shifted upwardly so that the cutting tools engage and machine the upper surface 88 of the workpiece 86.

Conventional timing means are employed to activate the feed unit 80 to axially shift the workpiece 86 into engagement with the cutting members 62 when the workpiece 86 is axially aligned with the open space 64 on the wheel surface 30. The upfeed of the workpiece 86 into the cutting members 62 need only equal the amount of stock to be removed, typically less than a few one-hundredths of an inch, and this can be easily accomplished despite high rotational speed of the wheel. Although any conventional timing means can be used, as shown, a cam 106 on the wheel 24 engages a cam follower 108 secured to the crown 34 and operatively coupled to activate the feed cylinder 102. Moreover, preferably the feed unit 80 is operable to shift the workpiece 86 upwardly so that the entire surface 88 can be machined during one revolution of the wheel 24.

Alternatively, the feed unit 80 is operable to incrementally feed the workpiece 86 axially upwardly toward the wheel 24 so that the workpiece surface 88 is completely machined following a predetermined number of rotations of the wheel 24. In this latter event, the incremental feed of the workpiece 86 by the unit 80 is accomplished when the workpiece 86 is aligned with the open area 64 on the wheel surface 30.

The incremental upfeed of the workpiece 86 toward the wheel 24 is highly advantageous for machining thin walled and/or fragile workpieces, such as cast iron and aluminum parts, which cannot withstand high stock removal without distortion and/or breakage. The incremental upfeed and the multiple cutting passes achievable with the present invention enables relative low stock removal per cutting pass of the wheel thus eliminating distortion and/or breakage of such parts. Moreover, for the example used, each cutting pass requires only one second so that a five pass machine cycle would require only five seconds in contrast to $2\frac{1}{2}$—3 minutes for the previously known linear rams and rotary broaches.

In the event that an incremental feed of the workpiece 86 into the cutting members 62 on the wheel surface 30 is utilized, it would be desirable to retract the finish cutting members 62 in section 72 on the wheel surface 30 so that the finish cutting members 62 engage the workpiece surface 88 only during the final machining cycle or revolution of the wheel 24 against each workpiece 86.

Figure 3:
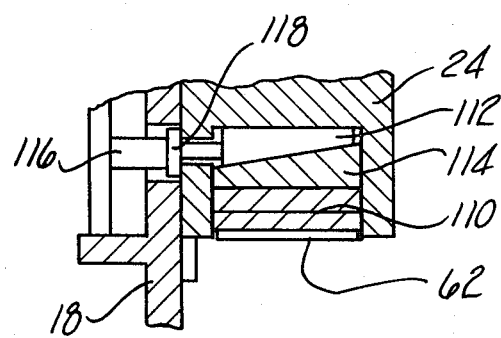
FIG. 3 is a fragmentary sectional view illustrating a modification of the present invention.

With reference then to FIG. 3, the finish cutting members 62 are preferably mounted on a platen 110 which is axially slidably mounted to the wheel 24. A pair of wedges 112 and 114 are positioned in between the wheel 24 and the platen 110 so that as the wedge 112 is displaced radially outwardly, the platen 110 with its attached finish cutting member 62 is shifted downward into cutting engagement with the workpiece surface 88. Conversely, retraction of the wedge member 112 radially inwardly with respect to the axis of rotation of the wheel 24 moves the platen 110 with its attached finish cutting members 62 axially away and out of cutting engagement with the workpiece surface 88. Any suitable means can be utilized to radially displace the wedge 112, such as a cam 116 mounted to the frame which engages a cam follower 118 secured to the wedge 112 during the final machine cycle on the part 88, can be used to axially displace the platen 110.

Although the operation of the apparatus 10 according to the present invention should, by now, be apparent, in brief the wheel 24 is rotatably driven on the frame 12 by the motor means 50 at a relatively constant rate of speed. In order to machine the workpiece 86, the workpiece 86 is first attached to its fixture 84. When the workpiece 86 is aligned with the open space 64 on the wheel surface 30, the feed unit 80 is activated which shifts the workpiece 86 axially upwardly towards the wheel 24 and so that the upper surface 88 of the workpiece 86 is moved into the machining engagement with the cutting members 62. The total up feed of the workpiece 86 can be achieved during a single revolution of the wheel 24 or incrementally as has been previously described.

Following the machining of the workpiece surface 88, the feed unit 80 lowers the work fixture 84 with its attached workpiece 86 and the machine workpiece 86 is removed from the fixture 84 and replaced by an unmachined workpiece 86. The above described process is then repeated. Moreover, as has been previously described, the apparatus 10 is capable of simultaneously machining a plurality of workpieces 86 at work stations circumferentially spaced about the frame 12.

The use of multiple work stations enables one or more workpieces to be machined while, simultaneously, one or more workpieces are loaded and/or unloaded onto the holding fixtures at other work stations. Thus, the machining time of the apparatus is limited only by the rotational speed and strength of the wheel, the number of cutting passes and the number of work stations. In this event the load and unload time does not affect the machine cycle time.

Other modes of operation, however, are also possible with the apparatus 10 according to the present invention. For example, one modification of the apparatus 10 would be to secure the cutting members 62 entirely circumferentially around the wheel surface 30 and so that each cutting member 62 protrudes axially downwardly from the wheel surface 30 an equidistant amount. In this event, activation of the feed unit 80 with its attached workpiece 86 would machine the upper surface 88 of the workpiece 86 in an amount solely dependent upon the up feed produced by the feed unit 80. Still further modifications of my invention are also possible.

From the foregoing it can be seen that the apparatus 10 according to the present invention provides a novel machine device for producing flat surfaces which is compact and can be operated continuously thus eliminating the cyclic machining operation of the previously known linear rams. Moreover, the apparatus 10 according to the present invention is relatively compact and inexpensive in construction when contrasted to the previously known linear rams.

Having described my invention, however, many modifications thereto will become apparent to those skilled in the art to which it pertains without deviation from the spirit of the invention as defined by the scope of the appended claims.

I claim:

1. Apparatus for machining a flat surface on a workpiece comprising:
   a frame;
   an annular wheel and means for rotatably mounting said wheel to said frame about a predetermined axis of rotation;
   a plurality of circumferentially spaced cutting members mounted to one axial surface of said wheel;
   a workpiece holding fixture mounted to said frame at a position open to, spaced from and axially aligned with said one axial surface of said wheel, said fixture including means for holding the workpiece with the surface to be machined adjacent said one surface of said wheel;
   means for continuously rotating said wheel;
   means for selectively axially moving the fixture toward said wheel whereby said cutting members engage and machine said workpiece surface,
   wherein said cutting members are broaching tools which protrude axially outwardly from said wheel in a progressively increasing amount around the circumfery of said one surface of said wheel in a direction opposite from the direction of rotation of said wheel, said broaching tools extending only around a portion of the circumfery of said one surface of said wheel thus forming an open area on said one wheel surface having a tangential length greater than the width of the workpiece,
   wherein said means for axially moving said workpiece further comprises means for incrementally moving said workpiece toward said wheel surface during each revolution of said wheel when said workpiece is aligned with the open area of said wheel surface, and
   wherein said cutting members in the circumferential area adjacent said open area of said wheel in the direction of rotation of said wheel are finish cutting members, said apparatus further comprising means for axially selectively retracting said finish cutting members away from said workpiece and for axially extending said finish cutting members toward and into engagement with said workpiece during the final incremental rotational cutting cycle for a given workpiece.

2. The invention as defined in claim 1 wherein said means for axially moving said fixture comprises a base secured to said frame and having a channel which faces said wheel surface, a first wedge having an inclined surface and axially slidably positioned in said channel, a second wedge having an inclined surface and only axially slidably positioned in said channel so that the inclined wedge surfaces flatly abut against each other, said fixture being secured to the second wedge, and means for radially moving said first wedge in said channel to thereby axially displace said fixture.

3. The invention as defined in claim 1 wherein said means for axially retracting said cutting members comprises a base secured to said wheel and having a channel which faces said workpiece, a first wedge having an inclined surface and axially slidably positioned in said channel a second wedge having an inclined surface and only axially slidably positioned in said channel so that the inclined wedge surfaces flatly abut against each other, said finish cutting members being secured to the second wedge, and means for radially moving said first wedge in said channel to thereby axially displace said finish cutting members.

4. The invention as defined in claim 1 wherein the cutting members are tungsten carbide cutting tools.

5. The invention as defined in claim 1 and including a second work holding fixture mounted to said frame at a position circumferentially spaced from said first fixture, said second fixture being open to, spaced from and axially aligned with said wheel surface, said second fixture including means for holding a further workpiece with its surface to be machined adjacent said wheel surface; and means for selectively axially moving the second fixture toward said wheel surface whereby said cutting members engage and machine said further workpiece surface.

6. The invention as defined in claim 1 wherein said frame includes an annular track on which said wheel adjacent said wheel surface is mounted rotatably, and wherein said frame further comprises a crown having an annular surface which cooperates with an annular surface on the other axis end of the wheel to prevent axial displacement of said wheel relative to said frame.

7. The invention as defined in claim 1 wherein said wheel is rotatably driven between 200 and 2000 surface feet per minute of the cutting members.

8. The invention as defined in claim 1 wherein said cutting members are broaching tools.

* * * * *